United States Patent
Nishi et al.

(10) Patent No.: US 9,211,800 B2
(45) Date of Patent: Dec. 15, 2015

(54) BATTERY SYSTEM AND CONTROL METHOD OF BATTERY SYSTEM

(75) Inventors: Yuji Nishi, Nagoya (JP); Shunsuke Fujii, Fujieda (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 464 days.

(21) Appl. No.: 13/581,298

(22) PCT Filed: Jun. 7, 2011

(86) PCT No.: PCT/JP2011/003205
§ 371 (c)(1),
(2), (4) Date: Aug. 24, 2012

(87) PCT Pub. No.: WO2012/168963
PCT Pub. Date: Dec. 13, 2012

(65) Prior Publication Data
US 2013/0063091 A1    Mar. 14, 2013

(51) Int. Cl.
 *H02J 7/00* (2006.01)
 *B60L 11/18* (2006.01)
 *H02H 9/00* (2006.01)

(52) U.S. Cl.
CPC ......... *B60L 11/1824* (2013.01); *B60L 11/1853* (2013.01); *H02H 9/001* (2013.01); *H02J 7/0016* (2013.01); *H02J 7/0031* (2013.01); *Y02T 10/7005* (2013.01); *Y02T 10/705* (2013.01);
(Continued)

(58) Field of Classification Search
CPC ....... G06F 1/30; G06F 1/263; Y10T 307/625; Y10T 10/7005; Y10T 90/12; H02J 9/061; H02J 1/14; H02J 7/0016; H02J 7/0068; H02J 7/34; B60L 11/1853

USPC .................................................. 320/120–127
See application file for complete search history.

(56) References Cited

U.S. PATENT DOCUMENTS

| | | | |
|---|---|---|---|
| 2003/0015994 A1* | 1/2003 | Yang | 320/162 |
| 2007/0247106 A1 | 10/2007 | Kawahara et al. | |
| 2009/0195217 A1* | 8/2009 | Choi et al. | 320/152 |

(Continued)

FOREIGN PATENT DOCUMENTS

| | | |
|---|---|---|
| CN | 101888099 A | 11/2010 |
| JP | 05-199667 A | 8/1993 |

(Continued)

OTHER PUBLICATIONS

International Search Report mailed Feb. 28, 2012 of PCT/JP2011/003205.

*Primary Examiner* — Binh Tat
(74) *Attorney, Agent, or Firm* — Kenyon & Kenyon LLP

(57) ABSTRACT

A battery system includes a first battery and a second battery connected in parallel and performing charge and discharge. A first relay is switched between an ON state in which the charge and discharge of the first battery are allowed and an OFF state in which the charge and discharge of the first battery are prohibited. A second relay is switched between an ON state in which the charge and discharge of the second battery are allowed and an OFF state in which the charge and discharge of the second battery are prohibited. A controller controls the ON state and the OFF state of each of the first relay and the second relay. The controller also changes the order in which the first relay and the second relay are switched to the ON state, in performing the charge and discharge of the first battery and the second battery.

18 Claims, 4 Drawing Sheets

(52) U.S. Cl.
CPC ............... *Y02T 90/12* (2013.01); *Y02T 90/121* (2013.01); *Y02T 90/14* (2013.01)

(56) References Cited

U.S. PATENT DOCUMENTS

2010/0116570 A1* 5/2010 Sugawara et al. ............ 180/65.1
2010/0301807 A1* 12/2010 Gamboa et al. ............... 320/118
2011/0298621 A1* 12/2011 Shanbhag ................. 340/573.1

FOREIGN PATENT DOCUMENTS

| JP | 2003111289 A | 4/2003 |
| JP | 2007-043808 A | 2/2007 |
| JP | 2007-259612 A | 10/2007 |
| JP | 2009-291016 A | 12/2009 |
| JP | 2010-124536 A | 6/2010 |

* cited by examiner

BATTERY SYSTEM AND CONTROL METHOD OF BATTERY SYSTEM

This is a 371 national phase application of PCT/JP2011/003205 filed 7 Jun. 2011, the contents of which are incorporated herein by reference.

FIELD OF THE INVENTION

The present invention relates to a battery system in which a first battery and a second battery are connected in parallel, and to a technology for controlling charge and discharge of the battery system.

BACKGROUND OF THE INVENTION

In a battery system, an assembled battery is connected to a load. In some battery systems, a plurality of assembled batteries are connected in parallel and those assembled batteries are connected to a load. In a configuration in which the plurality of assembled batteries are connected in parallel, a relay is provided for each of the assembled batteries. The relay is used to allow or prohibit charge and discharge of each of the assembled batteries.

PRIOR ART DOCUMENTS

Patent Documents

[Patent Document 1] Japanese Patent Laid-Open No. 2009-291016
[Patent Document 2] Japanese Patent Laid-Open No. 2010-124536

SUMMARY OF THE INVENTION

Problems to be Solved by the Invention

When the plurality of assembled batteries are connected in parallel, an OCV (Open Circuit Voltage) may vary among the plurality of assembled batteries. If the relay associated with each of the assembled batteries is switched from OFF to ON in the state in which the OCV varies, an inrush current may flow from the assembled battery having a higher OCV to the assembled battery having a lower OCV.

When the relays associated with the assembled batteries are turned ON in different timings, an inrush current may flow to the relay which is turned ON last, and that relay may be subjected to a thermal load due to the inrush current. The relay suffers damage due to the thermal load.

Means for Solving the Problems

A battery system according to the present invention has a first battery and a second battery connected in parallel and performing charge and discharge. A first relay is switched between an ON state in which the charge and discharge of the first battery are allowed and an OFF state in which the charge and discharge of the first battery are prohibited. A second relay is switched between an ON state in which the charge and discharge of the second battery are allowed and an OFF state in which the charge and discharge of the second battery are prohibited. A controller controls the ON state and the OFF state of each of the first relay and the second relay. The controller also changes the order in which the first relay and the second relay are switched to the ON state, in performing the charge and discharge of the first battery and the second battery.

The order in which the first relay and the second relay are switched to the ON state can be changed each time the charge and discharge of the first battery and the second battery are performed.

Damage due to a thermal load when each of the first relay and the second relay is switched from the OFF state to the ON state can be estimated on the basis of a terminal voltage of each of the first relay in the OFF state and the second relay in the OFF state. One of the first relay and the second relay that has smaller estimated damage can be switched last to the ON state, in performing the charge and discharge of the first battery and the second battery.

Since the relay switched last to the ON state may suffer damage, the relay having the smaller estimated damage can be switched last to the ON state to prevent the particular relay from being more damaged.

An information output section can be provided which outputs information about the life of each of the first relay and the second relay. The damage to each of the first relay and the second relay is estimated as described, and when the estimated damage reaches a threshold value, the information output section can be driven. This can notify a user or the like of the relay with the damage reaching the threshold value, in other words, the relay with the life expiring, through the information output section.

A third relay can be provided which is switched between an ON state in which the charge and discharge of the first battery and the second battery are allowed and an OFF state in which the charge and discharge of the first battery and the second battery are prohibited. For example, the first relay and the second relay can be connected to positive electrode terminals of the first battery and the second battery, respectively, and the third relay can be connected to negative electrode terminals of the first battery and the second battery.

Each of the first battery and the second battery can be provided by using an assembled battery formed of a plurality of cells connected in series. Outputs of the first battery and the second battery can be used for running of a vehicle.

According to a second aspect of the present application, a control method of a battery system is provided. The battery system includes a first battery and a second battery connected in parallel and performing charge and discharge, a first relay, and a second relay. The first relay is switched between an ON state in which the charge and discharge of the first battery are allowed and an OFF state in which the charge and discharge of the first battery are prohibited. The second relay is switched between an ON state in which the charge and discharge of the second battery are allowed and an OFF state in which the charge and discharge of the second battery are prohibited. The order in which the first relay and the second relay are switched to the ON state is changed in performing the charge and discharge of the first battery and the second battery.

Advantage of the Invention

According to the present invention, the order in which the first relay and the second relay are switched to the ON state is changed. In other words, the relay switched last to the ON state is switched between the first relay and the second relay. This can share the thermal load due to inrush current between the first relay and the second relay to suppress the deterioration of the first relay and the second relay.

DETAILED DESCRIPTION

Embodiments of the present invention will hereinafter be described.

Embodiment 1

Figure 1:
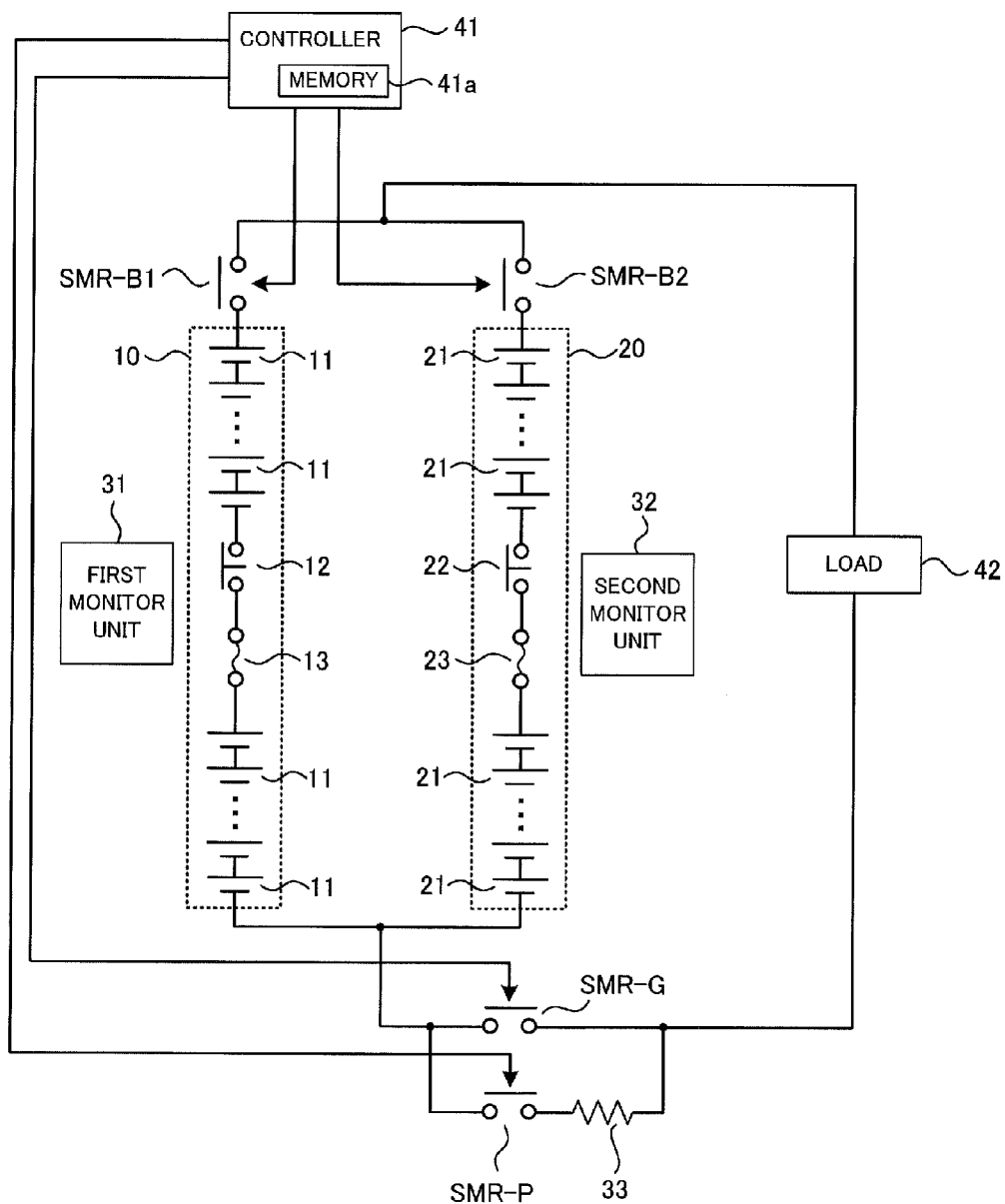
FIG. 1 is a diagram showing the configuration of a battery system which is Embodiment 1.

A battery system which is Embodiment 1 of the present invention is described with reference to FIG. 1. FIG. 1 is a diagram showing the configuration of the battery system.

A first battery pack (corresponding to a first battery) 10 and a second battery pack (corresponding to a second battery) 20 are connected in parallel. The first battery pack 10 has a plurality of cells 11 connected in series. The second battery pack 20 has a plurality of cells 21 connected in series.

A secondary battery such as a nickel metal hydride battery and a lithium-ion battery can be used as each of the cells 11 and 21. Instead of the secondary battery, an electric double layer capacitor can be used. In the present embodiment, at least one of the first battery pack 10 and the second battery pack 20 may include a plurality of cells connected in parallel.

The number of the cells 11 constituting the first battery pack 10 and the number of the cells 21 constituting the second battery pack 20 can be set as appropriate in view of the required output and the like. The number of the cells 11 and the number of the cells 21 may be equal to or different from each other.

The same type (same characteristics) of cell can be used as the cells 11 and 21. Alternatively, different types (different characteristics) of cell may be used as the cells 11 and 21. For example, the cell 11 can be provided by using a cell capable of charge and discharge with a current larger than that in the cell 21, and the cell 21 can be provided by using a cell having an electric storage capacitance larger than that of the cell 11.

The first battery pack 10 and the second battery pack 20 have service plugs (current breaker) 12 and 22, respectively. The service plugs 12 and 22 are used to break electric currents passing through the first battery pack 10 and the second battery pack 20, respectively. Specifically, the service plugs 12 and 22 can be physically removed from the battery packs 10 and 20 to break current paths in the battery packs 10 and 20, respectively. The battery packs 10 and 20 have fuses 13 and 23, respectively.

A system main relay (corresponding to a first relay) SMR-B1 is connected to a positive electrode terminal of the first battery pack 10. A system main relay (corresponding to a second relay) SMR-B2 is connected to a positive electrode terminal of the second battery pack 20. The system main relays SMR-B1 and SMR-B2 are connected in parallel. Each of the system main relays SMR-B1 and SMR-B2 is switched between ON and OFF in response to a control signal from a controller 41.

While the system main relay SMR-B1 is ON, charge and discharge of the first battery pack 10 can be performed. While the system main relay SMR-B1 is OFF, charge and discharge of the first battery pack 10 can be prohibited. While the system main relay SMR-B2 is ON, charge and discharge of the second battery pack 20 can be performed. While the system main relay SMR-B2 is OFF, charge and discharge of the second battery pack 20 can be prohibited.

A system main relay (corresponding to a third relay) SMR-G is connected to negative electrode terminals of the first battery pack 10 and the second battery pack 20. The system main relay SMR-G is switched between ON and OFF in response to a control signal from the controller 41. While the system main, relay SMR-G is ON, charge and discharge of the first battery pack 10 and the second battery pack 20 can be performed.

A system main relay SMR-P is connected in series with a limiting resistor 33. The system main relay SMR-P and the limiting resistor 33 are connected in parallel with the system main relay SMR-G. The limiting resistor 33 is used to suppress a flow of inrush current.

The first battery pack 10 and the second battery pack 20 are connected to a load 42. When the system main relays SMR-B1 and SMR-G are ON, the first battery pack 10 can be connected to the load 42. When the system main relays SMR-B2 and SMR-G are ON, the second battery pack 20 can be connected to the load 42.

The battery packs 10 and 20 can be mounted on a vehicle, for example. Specifically, the battery packs 10 and 20 can be used as a power source for running of the vehicle. When the battery packs 10 and 20 are mounted on the vehicle, a motor generator can be used as the load 42.

The motor generator (load) 42 can receive an electric energy from each of the battery packs 10 and 20 to generate a kinetic energy for running of the vehicle. On the other hand, for decelerating or stopping the vehicle, the motor generator (load) 42 can convert a kinetic energy produced in breaking of the vehicle into an electric energy. The electric energy generated by the motor generator (load) 42 can be stored as regenerative power in the battery packs 10 and 20.

A step-up circuit or an inverter may be placed between the motor generator and the battery packs 10 and 20. The step-up circuit can increase an output voltage of each of the battery packs 10 and 20. The step-up circuit can also reduce an output voltage of the motor generator. The inverter can convert a DC power from each of the battery packs 10 and 20 into an AC power. When the inverter is used, an AC motor can be used as the motor generator. The inverter can convert an AC power from the AC motor into a DC power.

A first monitor unit 31 monitors the state of the first battery pack 10. The monitored state of the first battery pack 10 includes, for example, the voltage, the current, and the temperature of the first battery pack 10. The first monitor unit 31 has the function of equalizing the voltages among the plurality of cells 11.

Specifically, the first monitor unit 31 detects the voltage of each of the cells 11. When the voltage varies among the plurality of cells 11, the first monitor unit 31 can discharge only a particular one of the cells 11 to reduce the variations in voltage. A switching element and a resistor are connected in parallel with each of the cells 11, and the first monitor unit 31 can turn on the switching element to discharge only the particular cell 11.

A second monitor unit 32 monitors the state of the second battery pack 20. The monitored state of the second battery pack 20 includes, for example, the voltage, the current, and the temperature of the second battery pack 20. The second monitor unit 32 has the function of equalizing the voltages among the plurality of cells 21. The second monitor unit 32 can have the same circuit configuration as that of the first monitor unit 31.

Figure 2:
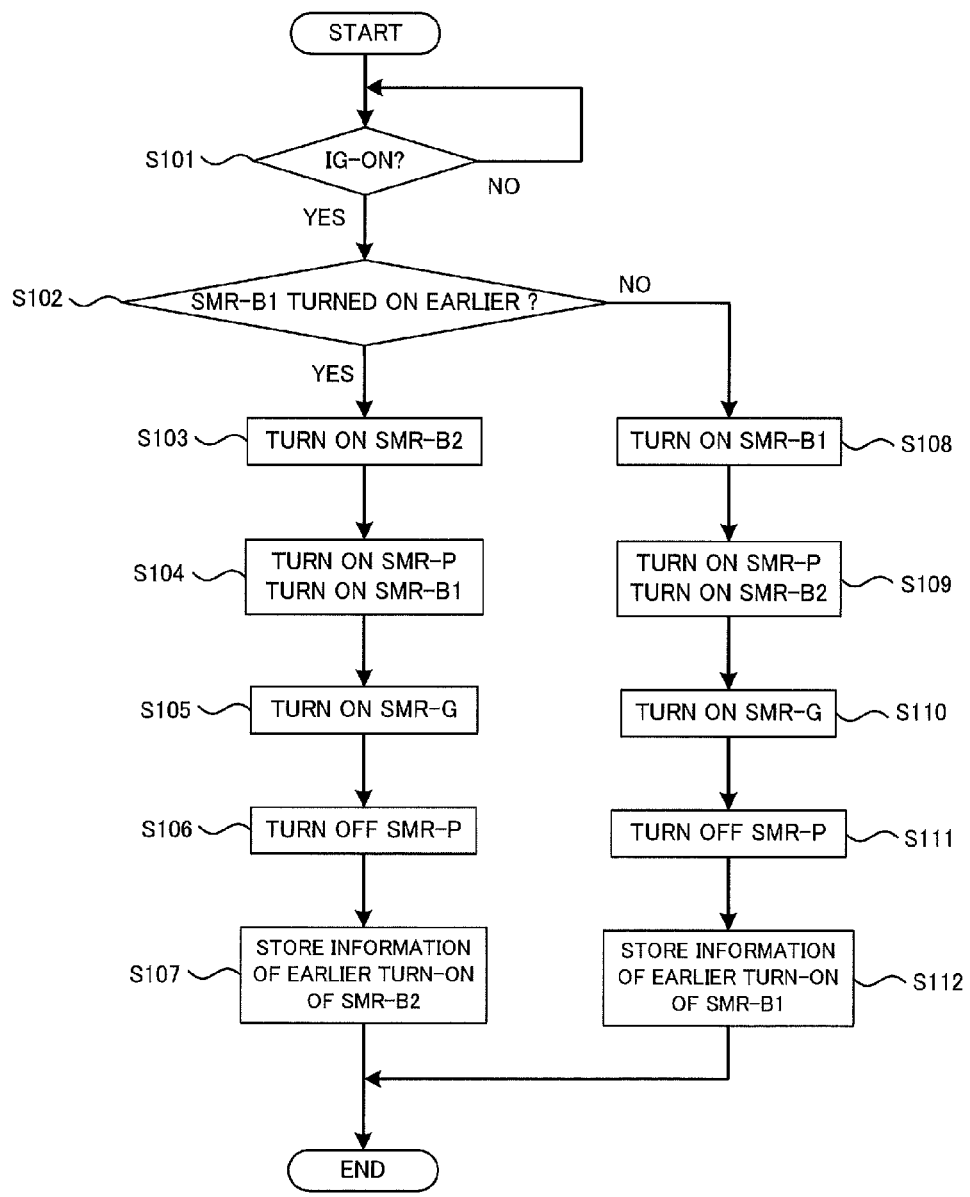
FIG. 2 is a flow chart for describing the operation of the battery system which is Embodiment 1.

Description is now made of operation in controlling charge and discharge of the first battery pack 10 and the second battery pack 20 with reference to a flow chart shown in FIG. 2. Processing shown in FIG. 2 is performed in connecting the battery packs 10 and 20 to the load 42 in the vehicle on which the battery packs 10 and 20 are mounted. The processing shown in FIG. 2 is performed by the controller 41.

At step S101, the controller 41 determines whether or not an ignition switch of the vehicle is switched from OFF to ON. When the ignition switch is switched from OFF to ON, the process proceeds to step S102.

At step S102, the controller 41 determines whether or not the system main relay SMR-B1 was switched from OFF to ON earlier than the system main relay SMR-B2 in the previous processing. The previous processing refers to the latest processing of the processing (the processing shown in FIG. 2) performed at the switching of the ignition switch from OFF to ON.

When the system main relay SMR-B1 was switched from OFF to ON earlier than the system main relay SMR-B2 in the previous processing, the process proceeds to step S103, and when not, the process proceeds to step S108.

Information indicating which of the system main relays SMR-B1 and SMR-B2 was switched from OFF to ON earlier can be stored in a memory 41a (see FIG. 1) contained in the controller 41. While the memory 41a is contained in the controller 41 in the present embodiment, the memory 41a may be placed outside the controller 41.

At step S103, the controller 41 switches the system main relay SMR-B2 from OFF to ON. The system main relay SMR-B1 remains OFF.

At step S104, the controller 41 switches the system main relays SMR-P and SMR-B1 from OFF to ON. This causes the first battery pack 10 and the second battery pack 20 to be connected to the load 42. Charge and discharge currents of the battery packs 10 and 20 pass through the limiting resistor 33.

The controller 41 switches the system main relay SMR-G from OFF to ON at step S105, and switches the system main relay SMR-P from ON to OFF at step S106.

This completes the connection between the battery packs 10 and 20 and the load 42. When the powers of the battery packs 10 and 20 are supplied to the load (motor generator) 42, the vehicle can be run. In breaking of the vehicle, the battery packs 10 and 20 can store the power from the load (motor generator) 42.

At step S107, the controller 41 stores information indicating that the system main relay SMR-B2 was switched ON earlier than the system main relay SMR-B1 in the memory 41a. The information stored in the memory 41a is updated each time the ignition switch is switched from OFF to ON. The information stored in the memory 41a is used in the processing at step S102 when the ignition switch is switched from OFF to ON next.

On the other hand, at step S108, the controller 41 switches the system main relay SMR-B1 from OFF to ON. The system main relay SMR-B2 remains OFF.

At step S109, the controller 41 switches the system main relays SMR-P and SMR-B2 from OFF to ON. This causes the first battery pack 10 and the second battery pack 20 to be connected to the load 42. Charge and discharge currents of the battery packs 10 and 20 pass through the limiting resistor 33.

The controller 41 switches the system main relay SMR-G from OFF to ON at step S110, and switches the system main relay SMR-P from ON to OFF at step S111. This completes the connection between the battery packs 10 and 20 and the load 42.

At step S112, the controller 41 stores information indicating that the system main relay SMR-B1 was switched ON earlier than the system main relay SMR-B2 in the memory 41a. The information stored in the memory 41a is updated each time the ignition switch is switched from OFF to ON. The information stored in the memory 41a is used in the processing at step S102 when the ignition switch is switched from OFF to ON next.

In the battery system of the present embodiment, a difference in OCV (Open Circuit Voltage) may occur between the first battery pack 10 and the second battery pack 20. Possible causes of the different OCVs include the following.

A difference in resistance occurs between the first battery pack 10 and the second battery pack 20 due to different temperatures or different deterioration states thereof. On the other hand, since the first battery pack 10 and the second battery pack 20 are connected in parallel, CCVs (Closed Circuit Voltage) of the battery packs 10 and 20 are equal to each other. The CCV and the OCV have the relationship represented by the following expression (1).

$$CCV = OCV + IR \tag{1}$$

where I represents an electric current passing through each of the battery packs 10 and 20, and R represents an internal resistance of each of the battery packs 10 and 20.

When the difference in resistance occurs between the battery packs 10 and 20, the OCVs of the battery packs 10 and 20 are different from each other even when the CCVs of the battery packs 10 and 20 are equal to each other.

On the other hand, the OCVs of the battery packs 10 and 20 may be different from each other in association with variations in self-discharge characteristics between the battery packs 10 and 20. For example, when the battery packs 10 and 20 are left at rest for a long time, the OCVs of the battery packs 10 and 20 tend to be different from each other.

In the battery system of the present embodiment, the first monitor unit 31 and the second monitor unit 32 are provided for the first battery pack 10 and the second battery pack 20, respectively. Thus, the monitor units 31 and 32 perform the equalization processing individually in the first battery pack 10 and the second battery pack 20. The independent equalization processing may result in a difference in OCV between the battery packs 10 and 20.

When the difference in OCV occurs between the first battery pack 10 and the second battery pack 20, an inrush current may pass from the battery pack having the higher OCV into the battery pack having the lower OCV at the switching of the system main relays SMR-B1 and SMR-B2 from OFF to ON. The system main relays SMR-B1 and SMR-B2 are switched from OFF to ON in different timings. Thus, the system main relay switched last from OFF to ON is more deteriorated due to a thermal load due to the inrush current.

If the system main relays. SMR-B1 and SMR-B2 are always switched from OFF to ON in the same order, only one of the system main relays SMR-B1 and SMR-B2 is concentratedly subjected to the thermal load due to the inrush current. In this case, the life of the only one of the system main relays is shortened.

In the present embodiment, the switching order of the system main relays SMR-B1 and SMR-B2 from OFF to ON is changed as described with reference to FIG. 2. Specifically, each time the ignition switch is switched ON, the system main relays SMR-B1 and SMR-B2 are alternately set as the system main relay switched last from OFF to ON.

This allows the thermal load due to the inrush current to be shared between both of the system main relays SMR-B1 and SMR-B2. The sharing of the thermal load can prevent concentration of the thermal load on one of the system main relays to suppress the shortened life due to the thermal load.

While the system main relays SMR-B1 and SMR-B2 are connected to the positive electrode terminals of the battery packs 10 and 20, respectively, and the system main relays SMR-P and SMR-G are connected to the negative electrode terminals of the battery packs 10 and 20 in the battery system of the present embodiment, the present invention is not limited thereto. For example, the system main relays SMR-B1 and SMR-B2 may be connected to the negative electrode terminals of the battery packs 10 and 20, respectively, and the system main relays SMR-P and SMR-G may be connected to the positive electrode terminals of the battery packs 10 and 20.

While the system main relays SMR-B1 and SMR-B2 are alternately set as the system main relay switched last from OFF to ON in the present embodiment, the present invention is not limited thereto. Specifically, it is only required that the number of times the system main relay SMR-B1 is switched ON last should be equal to the number of times the system main relay SMR-B2 is switched ON last when a predetermined number of times of switchings of the ignition switch to ON are completed. Thus, the processing of switching ON the system main relay SMR-B1 or the system main relay SMR-B2 last may be performed in succession.

For example, the system main relay SMR-B2 and the system main relay SMR-B1 can be switched ON in this order in response to the first turn-on and the second turn-on of the ignition switch, respectively. The system main relay SMR-B1 and the system main relay SMR-B2 can be switched ON in this order in response to the third turn-on and the fourth turn-on of the ignition switch, respectively. At the fourth switching of the ignition switch to ON, the number of times the system main relay SMR-B1 is switched ON last is equal to the number of times the system main relay SMR-B2 is switched ON last.

While the two battery packs 10 and 20 are used in the present embodiment, three or more battery packs may be used. Specifically, three or more battery packs can be connected in parallel. When the three or more battery packs are used, system main relays corresponding to the system main relays SMR-B1 and SMR-B2 are connected to the respective battery packs.

When three or more system main relays are used, the system main relay switched last from OFF to ON may also be changed in turn. For example, when three system main relays (referred to as a first relay, a second relay, and a third relay) are used, the relay switched last from OFF to ON may be changed in the order of the first relay, the second relay, then the third relay. It is only required that the number of times the first relay, the second relay, and the third relay are switched ON last should be equal to each other when a predetermined number of switchings of the ignition switch to ON are completed.

Embodiment 2

Figure 3:
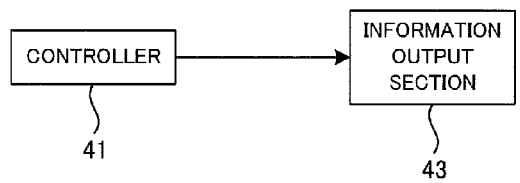
FIG. 3 is a diagram showing the configuration of part of a battery system which is Embodiment 2.

A battery system which is Embodiment 2 of the present invention will be described. FIG. 3 is a diagram showing the configuration of part of the battery system which is the present embodiment. Components having the same functions as those of the components described in Embodiment 1 are designated with the same reference numerals, and detailed description thereof is omitted. The description in the present embodiment is mainly focused on differences from Embodiment 1.

In the present embodiment, a controller 41 estimates damage total amounts D1_total and D2_total of system main relays SMR-B1 and SMR-B2. The system main relays SMR-B1 and SMR-B2 suffer damage due to a thermal load when an inrush current flows. Each time the system main relays SMR-B1 and SMR-B2 are switched from OFF to ON, the damage is accumulated in the system main relays SMR-B1 and SMR-B2. The accumulated damage corresponds to the damage total amounts D1_total and D2_total.

When the damage total amounts D1_total and D2_total reach a threshold value Dth, the controller 41 encourages exchange of the system main relays SMR-B1 and SMR-B2. The threshold value Dth is a preset value in view of the lives of the system main relays SMR-B1 and SMR-B2.

The controller 41 outputs a control signal to an information output section 43 when the damage total amounts D1_total and D2_total of the system main relays SMR-B1 and SMR-B2 reach the threshold value Dth. The information output section 43 receives the control signal from the controller 41 and outputs information encouraging the exchange of the system main relays SMR-B1 and SMR-B2. The information output section 43 is only required to notify a user or the like of the information encouraging the exchange of the system main relays SMR-B1 and SMR-B2. For example, a lamp, a display, and a speaker can be used as the information output section 43.

When the lamp is used as the information output section 43, the controller 41 can light the lamp when the damage total amounts D1_total and D2_total reach the threshold value Dth.

When the display is used as the information output section 43, the controller 41 can display information encouraging the exchange of the system main relays SMR-B1 and SMR-B2 on the display. The displayed information on the display is only required to be information which allows the user to know that the exchange of the system main relays SMR-B1 and SMR-B2 is encouraged. Characters or symbols can be used as appropriate for the displayed information.

When the speaker is used as the information output section 43, the controller 41 can output information encouraging the exchange of the system main relays SMR-B1 and SMR-B2 as a sound from the speaker. The details of the sound can be set as appropriate.

Figure 4:
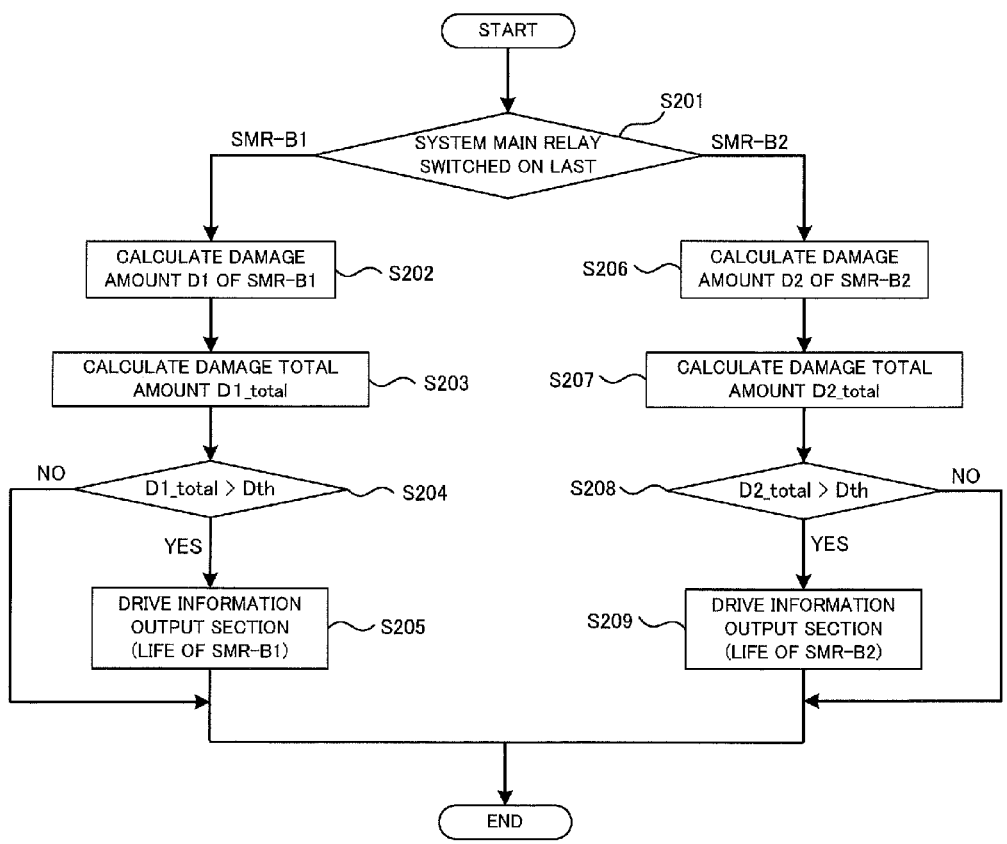
FIG. 4 is a flow chart for describing the operation of the battery system which is Embodiment 2.

FIG. 4 is a flow chart showing operation of the battery system in the present embodiment. Processing shown in FIG. 4 is performed by the controller 41. The processing shown in FIG. 4 can be performed, for example after the processing shown in FIG. 2 is completed.

At step S201, the controller 41 determines whether the system main relay SMR-B1 or SMR-B2 is switched ON last. When the system main relay switched ON last is the system main relay SMR-B1, the process proceeds to step S202; When the system main relay switched ON last is the system main relay SMR-B2, the process proceeds to step S206.

At step S202, the controller 41 calculates a damage amount D1 of the system main relay SMR-B1. The damage amount D1 refers to the amount of damage to the system main relay SMR-B when the system main relay SMR-B1 is switched ON.

The damage amount D1 can be calculated (estimated) with one of three methods described below. The calculation method of the damage amount D1 is not limited to the methods described below. In other words, any method can be employed as long as the amount of damage due to the thermal load can be specified.

In the first method, a terminal voltage V of the system main relay SMR-B1 and the value of an electric current I passing through the system main relay SMR-B1 are measured first. The voltage V corresponds to a difference between the total voltage of a first battery pack 10 and the total voltage of a second battery pack 20 before the system main relay SMR-B1 is switched ON. The damage amount D1 can be calculated on the basis of the following expression (2).

[Expression 1]

$$D1 = \int I(t)V(t)dt \quad (2)$$

In the expression (2), t represents time. I(t) represents a change in the current value I over time. V(t) represents a change in the voltage V over time.

In the second method, the terminal voltage V of the system main relay SMR-B1 is measured. The voltage V corresponds to the difference between the total voltage of the first battery pack 10 and the total voltage of the second battery pack 20 before the system main relay SMR-B1 is switched ON. The relationship between the voltage V and the damage amount D1 is previously specified and stored as a map in the memory 41a. The damage amount D1 can be specified by using the map and the measured voltage V.

When the damage amount D1 changes with temperature, the parameter of the temperature can be included in the map. Specifically, it is possible to previously create a map with which the damage amount D1 can be determined by specifying the temperature and the voltage V.

In the third method, a peak current Ipeak passing the system main relay SMR-B1 is measured when chattering is produced in the system main relay SMR-B1. The damage amount D1 can be calculated on the basis of the following expression (3).

[Expression 2]

$$D1 = I_{peak} \times \int I(t)V(t)dt \quad (3)$$

In the expression (3), t represents time. I(t) represents a change in the current value I over time. V(t) represents a change in the voltage V over time.

At step S203, the controller 41 calculates the damage total amount D1_total of the system main relay SMR-B1. Specifically, the controller 41 calculates the damage total amount D1_total in the current processing by adding the damage amount D1 calculated at step S202 to a damage total amount D1_total calculated up to the previous processing.

At step S204, the controller 41 determines whether or not the damage total amount D1_total calculated at step S203 is larger than the threshold value Dth. When the damage total amount D1_total is larger than the threshold value Dth, the process proceeds to step S205, and when not, the processing is ended.

At step S205, the controller 41 determines that the life of the system main relay SMR-B1 has expired, and drives the information output section 43. The user can know that the life of the system main relay SMR-B1 has expired based on the output from the information output section 43.

On the other hand, the controller 41 calculates a damage amount D2 of the system main relay SMR-B2 at step S206. The calculation method of the damage amount D2 is the same as the calculation method of the damage amount D1.

At step S207, the controller 41 calculates the damage total amount D2_total of the system main relay SMR-B2. Specifically, the controller 41 calculates the damage total amount D2_total in the current processing by adding the damage amount D2 calculated at step S206 to a damage total amount D2_total calculated up to the previous processing.

At step S208, the controller 41 determines whether or not the damage total amount D2_total calculated at step S207 is larger than the threshold value Dth. When the damage total amount D2_total is larger than the threshold value Dth, the process proceeds to step S209, and when not, the processing is ended.

At step S209, the controller 41 determines that the life of the system main relay SMR-B2 has expired, and drives the information output section 43. The user can know that the life of the system main relay SMR-B2 has expired based on the output from the information output section 43.

According to the present embodiment, the lives of the system main relays SMR-B1 and SMR-B2 can be determined by calculating the damage total amounts D1_total and D2_total of the system main relays SMR-B1 and SMR-B2, respectively. The system main relays SMR-B1 and SMR-B2 can be exchanged on the basis of the lives of the system main relays SMR-B1 and SMR-B2.

Embodiment 3

A battery system which is Embodiment 3 of the present invention will be described. Components having the same functions as those of the components described in Embodiment 1 are designated with the same reference numerals, and detailed description thereof is omitted. The description in the present embodiment is mainly focused on differences from Embodiments 1 and 2.

Figure 5:
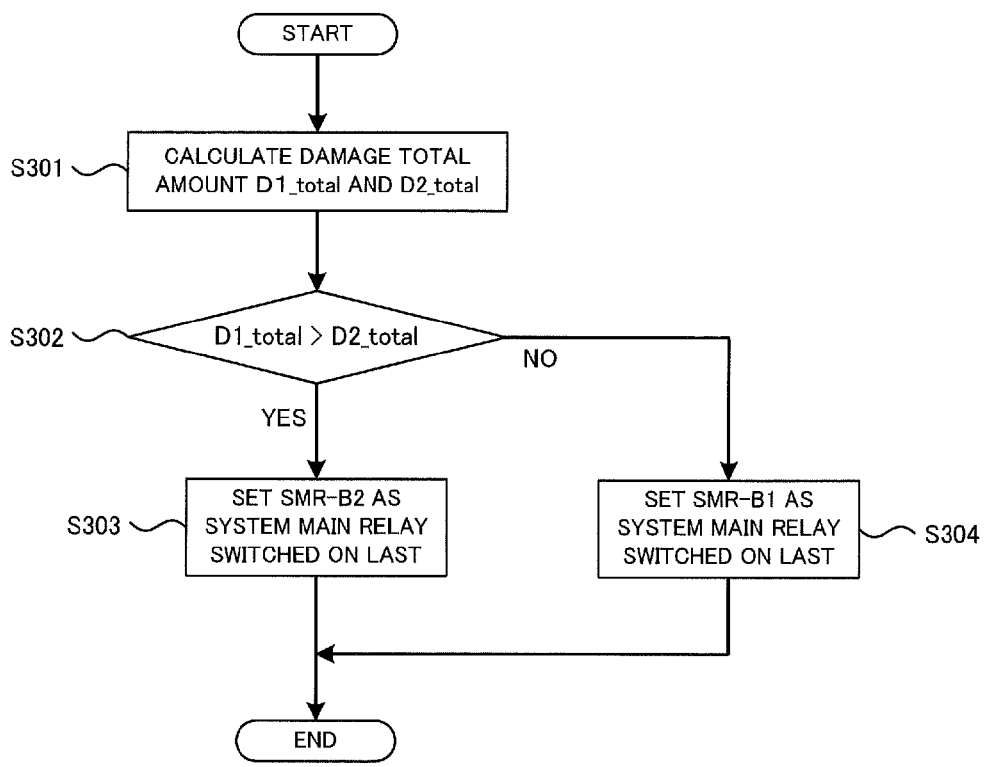
FIG. 5 is a flow chart for describing the operation of a battery system which is Embodiment 3.

In the present embodiment, damage total amounts D1_total and D2_total of system main relays SMR-B1 and SMR-B2 are calculated similarly to Embodiment 2. The system main relay having the smaller one of the damage total amount D1_total and D2_total is switched ON last. FIG. 5 is a flow chart for describing processing of the battery system in the present embodiment. The processing shown in FIG. 5 is performed by a controller 41.

At step S301, the controller 41 calculates the damage total amounts D1_total and D2_total of the system main relays SMR-B1 and SMR-B2, respectively. The damage total amounts D1_total and D2_total can be calculated with the method described in Embodiment 2.

Specifically, each time the system main relay SMR-B1 or the system main relay SMR-B2 is switched ON last, damage amounts D1 and D2 of the system main relays SMR-B1 and SMR-B2 are calculated. The damage amounts D1 and D2 can be added up to obtain the damage total amounts D1_total and D2_total.

At step S302, the controller 41 determines whether or not the damage total amount D1_total is larger than the damage total amount D2_total. When the damage total amount D1_total is larger than the damage total amount D2_total, the controller 41 determines that the system main relay SMR-B1 is deteriorated more than the system main relay SMR-B2, and proceeds to processing at step S303.

On the other hand, when the damage total amount D2_total is larger than the damage total amount D1_total, the controller 41 determines that the system main relay SMR-B2 is deteriorated more than the system main relay SMR-B1, and proceeds to processing at step S304.

At step S303, the controller 41 sets the system main relay SMR-B2 as the system main relay switched ON last. This setting information is stored in a memory 41a. When an ignition switch is switched from OFF to ON next, the controller 41 switches the system main relay SMR-B1 ON and then switches the system main relay SMR-B2 ON based on the setting information stored in the memory 41a. Thus, of the system main relays SMR-B1 and SMR-B2, the system main relay SMR-B2 is the one that is switched ON last.

At step S304, the controller 41 sets the system main relay SMR-B1 as the system main relay switched ON last. This setting information is stored in the memory 41a. When the ignition switch is switched from OFF to ON next, the controller 41 switches the system main relay SMR-B2 ON and then switches the system main relay SMR-B1 ON based on the setting information stored in the memory 41a. Thus, of the system main relays SMR-B1 and SMR-B2, the system main relay SMR-B1 is the one that is switched ON last.

According to the present embodiment, the system main relay switched ON last is changed depending on the deterioration states of the system main relays SMR-B1 and SMR-B2. This can suppress variations in deterioration between the system main relays SMR-B1 and SMR-B2. In other words, the damage can be shared between the system main relays SMR-B1 and SMR-B2 to increase the lives of the system main relays SMR-B1 and SMR-B2.

The invention claimed is:

1. A battery system comprising:
a first battery and a second battery, each of the batteries performing charge and discharge;
a first relay that is connected in series with the first battery and switched between an ON state in which the charge and discharge of the first battery are allowed and an OFF state in which the charge and discharge of the first battery are prohibited;
a second relay that is connected in series with the second battery and switched between an ON state in which the charge and discharge of the second battery are allowed and an OFF state in which the charge and discharge of the second battery are prohibited; and
a controller controlling the ON state and the OFF state of each of the first relay and the second relay,
wherein a group of the first battery and the first relay and a group of the second battery and the second relay are connected in parallel with respect to a motor generator that receives an electric energy from each of the first and second batteries to generate a kinetic energy for running of a vehicle, and
the controller selects a first case and a second case when the first and second relays are switched to the ON state to connect the first and second batteries to the motor generator, the first case where the second relay is switched to the ON state after switching the first relay to the ON state, the second case where the first relay is switched to the ON state after switching the second relay to the ON state.

2. The battery system according to claim 1, wherein the controller alternately selects the first and second cases each time the first and second relays are switched to the ON state to connect the first and second batteries to the motor generator.

3. The battery system according to claim 2, further comprising an information output section outputting information about the life of each of the first relay and the second relay,
wherein the controller estimates damages of the first and second relays due to a thermal load when each of the first relay and the second relay is switched from the OFF state to the ON state, based on a terminal voltage of each of the first relay in the OFF state and the second relay in the OFF state, and
drives the information output section when the estimated damage reaches a threshold value.

4. The battery system according to claim 1, wherein the controller estimates damages of the first and second relays due to a thermal load when each of the first relay and the second relay is switched from the OFF state to the ON state, based on a terminal voltage of each of the first relay in the OFF state and the second relay in the OFF state, and switches one of the first relay and the second relay that has smaller estimated damage to the ON state last when the first and second relays are switched to the ON state to connect the first and second batteries to the motor generator.

5. The battery system according to claim 4, further comprising an information output section outputting information about the life of each of the first relay and the second relay,
wherein the controller estimates damages of the first and second relays due to a thermal load when each of the first relay and the second relay is switched from the OFF state to the ON state, based on a terminal voltage of each of the first relay in the OFF state and the second relay in the OFF state, and
drives the information output section when the estimated damage reaches a threshold value.

6. The battery system according to claim 4, wherein the controller calculates the damage of each of the first and second relays based on the following expression, $$D = \int I(t)V(t)dt$$

where D represents the damage of each of the first and second relays, I represents an electric current passing through each of the first and second relays, V represents the terminal voltage of each of the first and second relays and t represents time.

7. The battery system according to claim 4, wherein the controller calculates the damage of each of the first and second relays based on the following expression, $$D = I_{peak} \times \int I(t)V(t)dt$$

where D represents the damage of each of the first and second relays, Ipeak represents a peak current passing through each of the first and second relays, I represents an electric current passing through each of the first and second relays, V represents the terminal voltage of each of the first and second relays and t represents time.

8. The battery system according to claim 4, wherein the controller calculates the damage of each of the first and second relays based on a correspondence between the damage and a difference between total voltages of the first and second batteries.

9. The battery system according to claim 1, further comprising an information output section outputting information about the life of each of the first relay and the second relay,
wherein the controller estimates damages of the first and second relays due to a thermal load when each of the first relay and the second relay is switched from the OFF state to the ON state, based on a terminal voltage of each of the first relay in the OFF state and the second relay in the OFF state, and
drives the information output section when the estimated damage reaches a threshold value.

10. The battery system according to claim 1, further comprising a third relay switched between an ON state in which the charge and discharge of the first battery and the second battery are allowed and an OFF state in which the charge and discharge of the first battery and the second battery are prohibited,
wherein the controller controls the ON state and the OFF state of the third relay.

11. The battery system according to claim 1, wherein each of the first battery and the second battery is an assembled battery formed of a plurality of cells connected in series.

12. The battery system according to claim 11, wherein each of the first battery and the second battery outputs an energy for use in running of a vehicle.

13. A control method of a battery system comprising a first battery and a second battery, each of the batteries performing charge and discharge, a first relay connected in series with the first battery and switched between an ON state in which the charge and discharge of the first battery are allowed and an OFF state in which the charge and discharge of the first battery are prohibited, and a second relay connected in series with the second battery and switched between an ON state in which the charge and discharge of the second battery are allowed and an OFF state in which the charge and discharge of the second battery are prohibited, a group of the first battery and the first relay and a group of the second battery and the second relay are connected in parallel with respect to a motor generator that receives an electric energy from each of the first and second batteries to generate a kinetic energy for running of a vehicle, the method comprising the step of:

selecting a first case and a second case when the first and second relays are switched to the ON state to connect the first and second batteries to the motor generator, the first case where the second relay is switched to the ON state after switching the first relay to the ON state, the second case where the first relay is switched to the ON state after switching the second relay to the ON state.

14. The control method according to claim 13, wherein the first and second cases are alternately selected each time the first and second relays are switched to the ON state to connect the first and second batteries to the motor generator.

15. The control method according to claim 13, wherein damages of the first and second relays due to a thermal load when each of the first relay and the second relay is switched from the OFF state to the ON state is estimated, based on a terminal voltage of each of the first relay in the OFF state and the second relay in the OFF state, and one of the first relay and the second relay that has smaller estimated damage is switched to the ON state last when the first and second relays are switched to the ON state to connect the first and second batteries to the motor generator.

16. The control method according to claim 13, wherein damages of the first and second relays due to a thermal load when each of the first relay and the second relay is switched from the OFF state to the ON state is estimated, based on a terminal voltage of each of the first relay in the OFF state and the second relay in the OFF state, and information about the life of each of the first relay and the second relay is output when the estimated damage reaches a threshold value.

17. The control method according to claim 14, wherein damages of the first and second relays due to a thermal load when each of the first relay and the second relay is switched from the OFF state to the ON state is estimated, based on a terminal voltage of each of the first relay in the OFF state and the second relay in the OFF state, and information about the life of each of the first relay and the second relay is output when the estimated damage reaches a threshold value.

18. The control method according to claim 15, wherein damages of the first and second relays due to a thermal load when each of the first relay and the second relay is switched from the OFF state to the ON state is estimated, based on a terminal voltage of each of the first relay in the OFF state and the second relay in the OFF state, and information about the life of each of the first relay and the second relay is output when the estimated damage reaches a threshold value.

* * * * *